United States Patent [19]

Guest

[11] Patent Number: 5,443,289

[45] Date of Patent: Aug. 22, 1995

[54] TUBE COUPLINGS

[76] Inventor: John D. Guest, 'Iona', Cannon Hill Way, Bray, Maidenhead, Berks, United Kingdom

[21] Appl. No.: 150,495

[22] Filed: Nov. 10, 1993

[30] Foreign Application Priority Data

Nov. 11, 1992 [GB] United Kingdom ............... 9223632
Oct. 20, 1993 [GB] United Kingdom ............... 9321605

[51] Int. Cl.6 ................ F16L 37/084; F16L 37/12
[52] U.S. Cl. .................... 285/39; 285/308; 285/322
[58] Field of Search ............ 285/39, 308, 322, 323, 285/320

[56] References Cited

U.S. PATENT DOCUMENTS

| 4,508,369 | 4/1985 | Mode | 285/39 |
| 4,804,213 | 2/1989 | Guest | 285/322 |
| 4,895,395 | 1/1990 | Ceriani | 285/39 |
| 4,915,421 | 4/1990 | Dennany, Jr. | 285/39 |
| 4,923,220 | 5/1990 | Guest et al. | 285/39 |
| 4,946,205 | 8/1990 | Washizu | 285/39 |
| 5,042,848 | 8/1991 | Shiozaki | 285/323 |
| 5,181,751 | 1/1993 | Kitamura | 285/39 |
| 5,370,423 | 12/1994 | Guest | 285/39 |

FOREIGN PATENT DOCUMENTS

| 2610694 | 8/1988 | France | 285/87 |
| 1520742 | 8/1978 | United Kingdom. | |
| 1573757 | 8/1980 | United Kingdom. | |
| 2132296 | 2/1986 | United Kingdom. | |

Primary Examiner—Eric K. Nicholson
Attorney, Agent, or Firm—Baker & Daniels

[57] ABSTRACT

The disclosure relates to a tube coupling comprising a coupling body, having a throughway open at one end to receive a tube. A first collet is mounted in the throughway to grip the tube and resist extraction of the tube from the throughway. A cap is mounted to extend over the open end of the coupling body to house a second collet arranged head to head with the first collet. The second collet is engageable with an annular abutment on the tube to retain the tube in the coupling body. A single release means in the form of plunger elements is provided on the cap to act on the collets to allow release of the tube from the coupling body.

21 Claims, 4 Drawing Sheets

TUBE COUPLINGS

BACKGROUND OF THE INVENTION

Field of the Invention

This invention relates to tube couplings and particularly, though not exclusively applicable to couplings for metal tubing such as in fuel or brake fluid lines as used in motor vehicles.

U.K. Patent Publication No. 1,520,742 discloses a tube coupling comprising a body having a throughway open at one end to receive a tube, the throughway having a tapered cam surface extending towards said one end and a collet comprising an annular sleeve located in the open end of the throughway and having resilient arms projecting axially into the throughway. The resilient arms of the collet engage the tapered cam surface with movement of the collet outwardly of the throughway to grip and lock the tube in place. The tube is released from the collet by depressing the collet into the throughway.

U.K. Patent Publication No. 1,573,757 discloses a tube coupling of the form described and illustrated in U.K. Patent Specification No. 1,520,742 in which the resilient extending arms of the collet have outer faces shaped to which bear against the tapered cam surface adjacent the sleeve portion of the collet. The inner sides of the arms have inwardly facing projections spaced towards the free ends of the arms to produce positive engagement with the tube.

U.K. Patent Publication No. 2,132,296 discloses a tube coupling of the form described and illustrated in U.K. Patent Publication Nos. 1,520,742 and 1,573,757 in which the coupling body is provided with an end cover, having a base wall formed with an aperture through which a tube can extend into the coupling body and a peripheral wall to engage around the outer periphery of the coupling body. An attachment arrangement is provided between the peripheral wall of the end cover and coupling body which enables the cover to be removed when it is required to release the tube from the coupling body but which prevents the base wall of the cover being accidentally pressed into engagement with the projecting end of the collet from the coupling body which could inadvertently release the tube from the coupling body.

European Patent Publication No. 0,255,368 discloses a tube coupling in which the end cover has manually operable members for engaging the projecting end of the collet to depress the collet into the throughway and thereby release the tube gripped in the coupling body.

European Patent Publication No 0280180 relates to a coupling bushing for connecting the ends of free lines for fluid media, in particular for fuel lines on internal combustion engines, having a bushing part which has at least one insertion opening, provided with an elastic sealing element, for receiving a line end provided with a holding shoulder, and having a blocking member engaging behind the holding shoulder of the line end. This arrangement is however difficult to operate and in particular is difficult to release when required.

This invention provides a tube coupling comprising a coupling body having a throughway open at one end to receive a tube means in the throughway to grip the tube and resist extraction of the tube from the throughway, detent means located on the coupling body to act on an annular abutment on the tube to retain the tube in the coupling body and one release means for releasing both the detent means and tube gripping means to allow release of the tube from the coupling.

Preferably the tube gripping means has means to relieve the gripping action projecting from the open end of the throughway and operable by being depressed into the throughway and the release means serves to release said detent means and to depress the tube gripping means for release of a tube.

It is also preferred that the coupling body has an enclosure for the open end of the coupling body having an aperture through which a tube to be inserted into the throughway may extend, the detent means for engaging the further annular abutment on the tube being located in the enclosure and said release means being provided on the enclosure for releasing both the detent means and tube gripping means.

In one construction according to the invention the detent means may comprise a collet which is located in the enclosure for limited axial movement between an end wall of the enclosure and the end of the coupling body, the collet having an annular head engageable with said grip relieving means projecting from the coupling body and radially resilient fingers projecting towards the end wall of the enclosure which snap over an abutment on a tube inserted into the coupling body to assist in retaining the tube in the coupling body.

More specifically the end wall of the enclosure may have an inwardly facing abutment surface with which the ends of the fingers are engagable to hold the fingers against radial outward movement thereby locking tube in a direction outwardly of the coupling body drawing the grip relieving means outwardly of the body until the gripping means act and the resulting movement of the collet with the grip relieving means engaging the collet fingers with the abutment surface.

For example the release means on the enclosure may comprise means to displace the collet into engagement with the grip relieving means to extract the ends of the fingers from the abutment surface on the enclosure and to displace the grip relieving means inwardly into the tube coupling body to allow a tube to be extracted from the coupling body.

In particular the abutment surface in the enclosure may extend around the aperture in the enclosure for the tube.

The annular head of the collet may be formed with an encircling angled ramp face on the side disposed away from the coupling body and depressable plunger elements may be mounted on the enclosure having angled cam faces engagable with the ramp face on the collet to space the collet towards the coupling body with depression of the plungers.

By way of example the depressable plungers may be formed integrally with flexible webs formed in the wall of the enclosure.

In any of the above arrangements said tube gripping means/grip relieving means may comprise a collet having a head disposed outside the coupling body and a plurality of resilient fingers projecting into the coupling body and the throughway may have an internal cam surface which tapers towards the open end of the throughway with which the fingers are engageable to be depressed radially inwardly to engage and grip a tube with movement of the collet outwardly of the throughway and to release the grip with inward movement.

In particular an annular cam element may be mounted in the throughway of the coupling body facing towards the collet with which the ends of the resilient fingers of the collet are engageable when the collet is depressed into the throughway to expand the fingers and thereby release their engagement from the tube.

In an alternative arrangement the tube gripping-/relieving means may comprise a grab ring mounted in the throughway and a sleeve extending from the grab ring from the open end of the throughway depressing of which relieves the grip of the grab ring.

The invention also provides a coupling body having a throughway open at one end to receive a tube, an enclosure on the body extending over said end with an end wall of the enclosure spaced from the end of the coupling body and having an aperture to receive the tube, a collet mounted in the enclosure for limited axial movement between the end wall and the coupling body, the collet having a head adjacent the coupling body and resilient fingers projecting towards the end wall of the enclosure to snap over an annular abutment on the tube inserted through the enclosure into the coupling body and release means on the enclosure to release the fingers from the abutment to allow extraction of the tube.

In accordance with a further feature of the invention, the resilient fingers of the collet may taper towards the head of the collet to increase the radial flexibility of the fingers adjacent the collet head.

More specifically, the collet may have three resilient fingers, the free ends of which are closely spaced and which taper in width towards the head of the collet.

In accordance with a still further feature of the invention, the collet may be aligned with the throughway in the coupling body by means of an intermediate sleeve extending between the throughway and collet.

More specifically, the sleeve may extend into the head end of the collet and may be provided with an encircling shoulder which is seated in a counter bore at the end of the collet.

In any of the above arrangements one or more O-ring seals may be mounted in the throughway in the coupling body to seal the external surface of the tube inserted in the coupling body.

DESCRIPTION OF THE PREFERRED EMBODIMENTS

Figure 1:
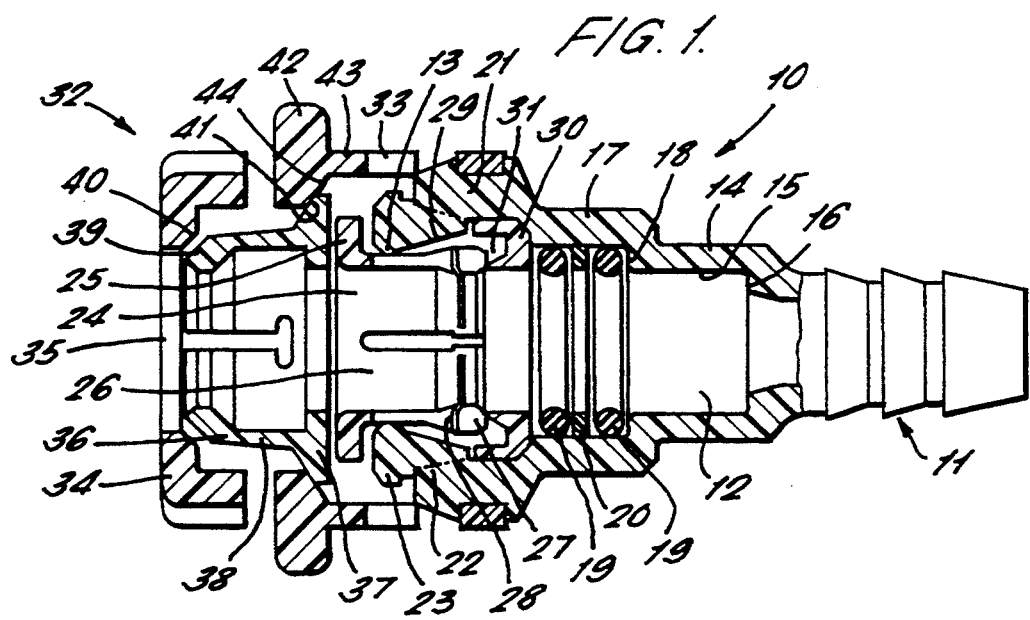
FIG. 1 is a sectional view through a tube coupling.

Referring to FIG. 1 of the drawings there is shown a tube coupling indicated generally at 10 comprising a moulded coupling body 11 having a throughway 12 which has an open end 13 to receive a tube to be secured and sealed in the body.

The coupling body includes a central portion 14 the internal diameter 15 of which corresponds generally to the outer diameter of the tube to be secured in the coupling body. The central portion 14 terminates in an annular shoulder 16 facing towards the open end of the body with which an end of a tube to be located in the body is engageable.

The central portion 14 of the body gives way to an enlarged diameter portion 17 and a step 18 in which a pair of O-ring seals 19 are located with a washer 20 disposed between the seals to seal with the outer surface of the tube to be located in the body. The enlarged diameter portion 17 of the body gives way to a further increase diameter portion 21 having an open end 22 in which a separate moulded annular insert 23 is secured which provides the end opening 13 to the throughway referred to above.

A collet 24 is mounted in the open end of the throughway comprising an annular head 25 disposed outside the throughway and a plurality of resilient fingers 26 projecting into the throughway and terminating in heads 27. The collet is moulded in plastics and the heads 27 have metal barbs 28 projecting through the heads to bear against and grip the surface of a tube extending through the collet.

The annular insert 23 is formed with an internal tapered cam surface 29 converging towards the open end 13 provided by the insert with which the heads 27 of the collet are engageable when the collet is drawn in a direction outwardly of the throughway to cause the heads to be pressed inwardly into gripping engagement with a tube passing through the collet. Conversely, displacement of the collet inwardly into the throughway releases the heads from the tapered cam surface to release the gripping action of the heads on the tube. To facilitate release of the heads from the tube a ring 30 is mounted in the enlarged part of the coupling body formed with an external tapered cam surface 31 facing toward the heads of the collet. Displacement of the collet into the throughway causes the heads to engage the cam face 31 to expand the heads outwardly away from the surface of the tube to facilitate release of the tube from the coupling body.

The coupling body 11 has a cap or enclosure 32 comprising an annular wall 33 secured to the enlarged diameter portion 21 of the coupling body and an end wall 34 spaced from the end of the coupling body 11. The end wall 34 has an aperture 35 through which a tube to be engaged in the coupling body is inserted.

The enclosure 32 contains a second collet 36 having an annular head 37 and resilient fingers 38 projecting from the head. The second collet is mounted head-to-head with the first collet so that the resilient fingers 38 of the second collet project away from the coupling body towards the end wall 34.

The ends of the resilient fingers 36 of the second collet have inturned heads 39 which are engageable with a bevel 40 formed around the aperture 35 of the inside of the end wall 34 so that when the heads 40 are engaged with the bevel, they are prevented from expanding radially.

The side of the head 37 of the second collet facing towards the end wall 34 has an angled cam face 41 facing towards the end wall 34. The encircling wall 33 of the enclosure is formed with apertures at diametrically opposite locations in the enclosure and plunger elements 42 are connected integrally with the wall of the enclosure by flexible webs 43 to project into the enclosure. The plunger elements have angled faces 44 engageable with the cam face 41 on the head 37 so that depressing the plungers radially inwardly deflects the second collet towards the head of the first collet releasing the heads 39 of the second collet from the bevel 40 on the end wall of the enclosure to allow the fingers to expand. Once the clearance between the heads of the collets has been taken up, continuing to depress the plungers 42 causes the first collet to be driven into the throughway to release the fingers of the first collet from a tube passing through the collet as described earlier. Thus the plunger 42 provides one release means for both the first and second collets.

Referring now to FIGS. 2 to 5 of the drawings, there is shown the sequence of operations of the coupling when a tube to be gripped in the coupling is to be inserted. The tube is indicated at 50 and it should be noted that the tube has an integral rounded encircling abutment 51 formed part-way from the end of the tube specifically for engagement by the second collet of the coupling.

Figure 2:
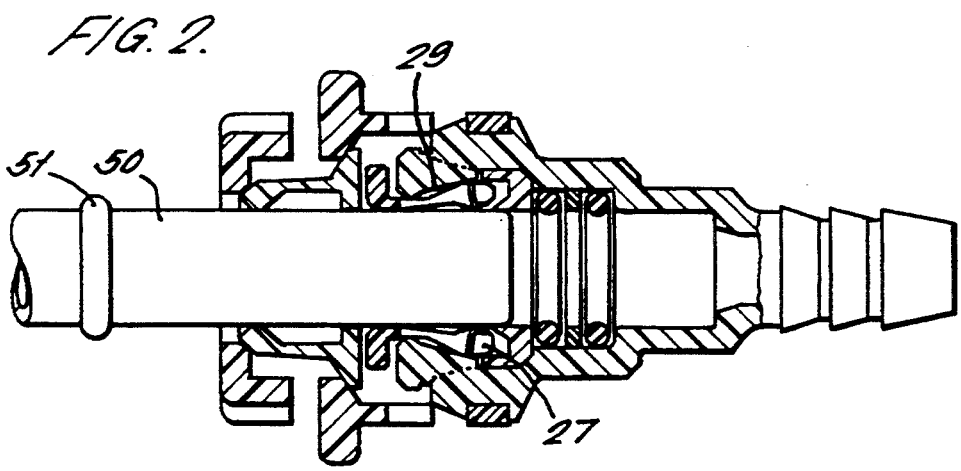
FIGS. 2 to 5 illustrate step by step insertion, engagement and release of a tube in the coupling.

In FIG. 2, the end of the tube is shown inserted through the aperture 35 of the enclosure on the coupling body and through the tube collet. As can be seen, the heads 27 of the collet within the coupling body have separated to accommodate the tube and are engaged with the tapered cam surface 29 so that the end of the tube is already gripped at this stage and any attempt to draw the tube would be resisted by the collet.

Figure 3:
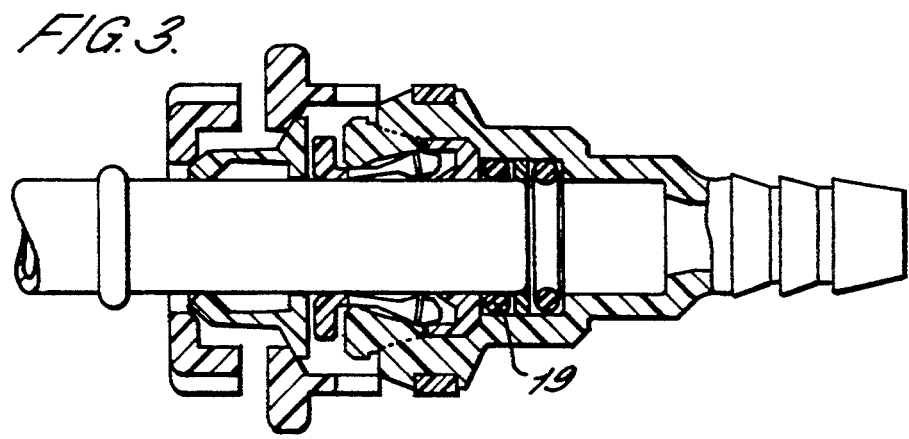

FIG. 3 shows the tube further inserted into the coupling body so that the end of the tube is located in the first of the O-ring seals 19.

Figure 4:
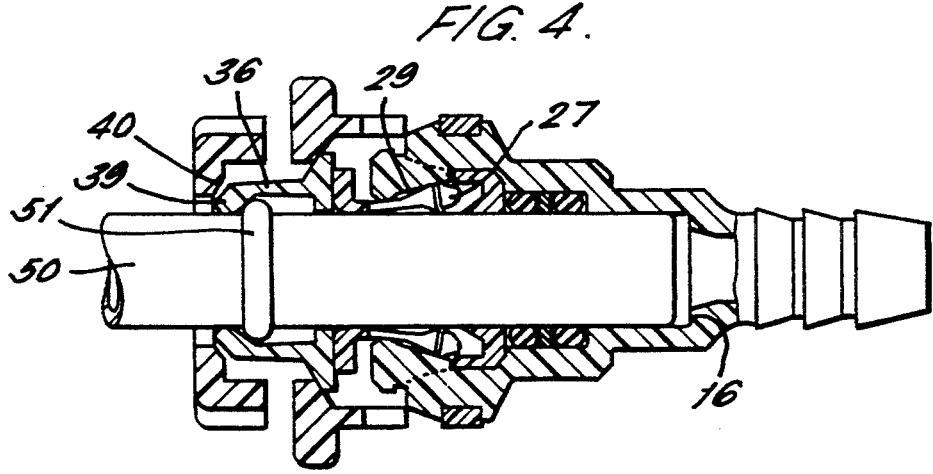

FIG. 4 shows the tube fully inserted into the coupling body with the end of the tube in the central portion 14 of the coupling body. The tube is in fact inserted until the end of the tube engages the shoulder 16. When the annular abutment 51 on the tube engages the heads 40 of the second collet, the second collet will be displaced from the position shown in FIG. 3 until the collets come head-to-head as shown in FIG. 4 and the collets are moved inwardly together until the heads 39 of the second collet are clear of the bevel 40 and the heads can then separate to allow the abutment 51 on the tube to pass through. Once the abutment has passed through, the heads close around the abutment 51 as shown in FIG. 4. A small movement of the tube outwardly of the coupling body as indicated by the gap between the shoulder 16 and end of the tube illustrated in FIG. 4 draws the first collet outwardly of the coupling body sufficiently to cause the heads 27 of the collet to be deflected inwardly by the tapered cam surface 29 into positive gripping engagement with the tube and at the same time the heads 39 of the second collet are engaged in the bevel face 40 on the end wall of the enclosure to lock the heads firmly inwardly against the abutment 51. The tube is therefore doubly locked to the coupling body.

Figure 5:
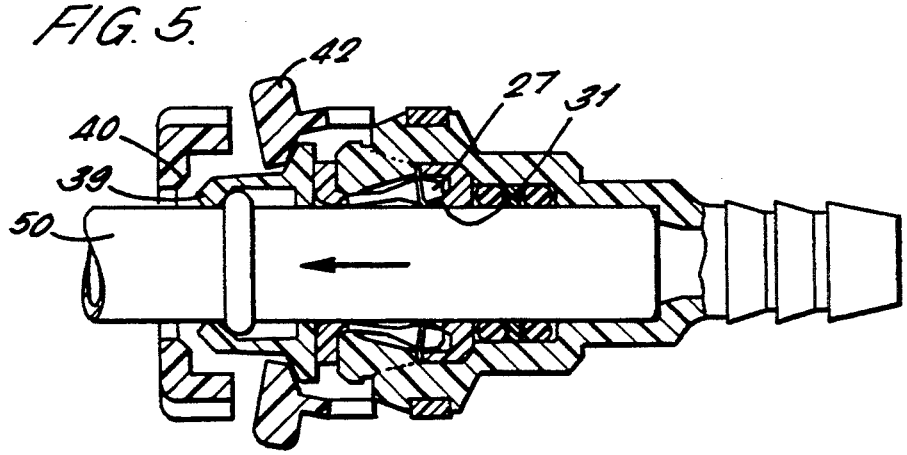

To release the tube from the coupling body, the plungers 42 on the enclosure are depressed inwardly as illustrated in FIG. 5 to draw the first collet towards the coupling body thereby releasing the heads 39 from the bevel face 40 and at the same time to depress the first collet inwardly into the coupling body to engage the heads 27 of the collet with the annular cam face 31 to release the heads from the tube which can then be extracted from the coupling body.

The arrangement thus provides a coupling for a tube which is effected simply by pushing the tube into the coupling body which grips, clips and seals the tube in place so that even if the main gripping collet in the coupling body should fail for any reason, the tube will still be held by the second collet in sealed engagement in the coupling body. At the same time, the tube can readily be extracted from the coupling body by simply depressing the plungers on the enclosure which enable both collets to be released from the tube.

In a modification of the above arrangement the collet 25 and tapered cam surface 29 are replaced by a grab ring mounted in the throughway to receive and grip a tube with a sleeve extending from the grab ring through the open end of the sleeve depressing of which by the head 37 of the second collet depresses the sleeve into the throughway to release the grab ring and thereby allow extraction of the tube.

Figure 6:
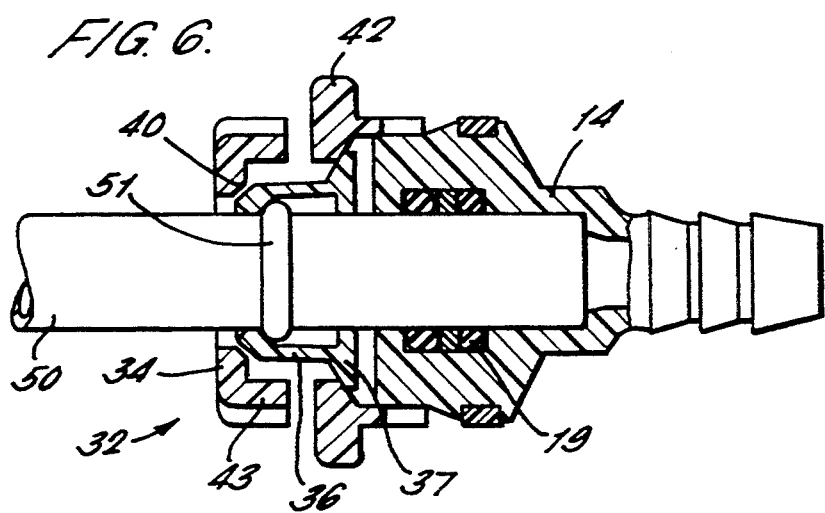
FIG. 6 illustrates a further construction in accordance with the invention.

FIG. 6 shows a further modification in which the tube is not gripped in the coupling body but is simply held by the external collet 36 in the enclosure 32.

Figure 7:
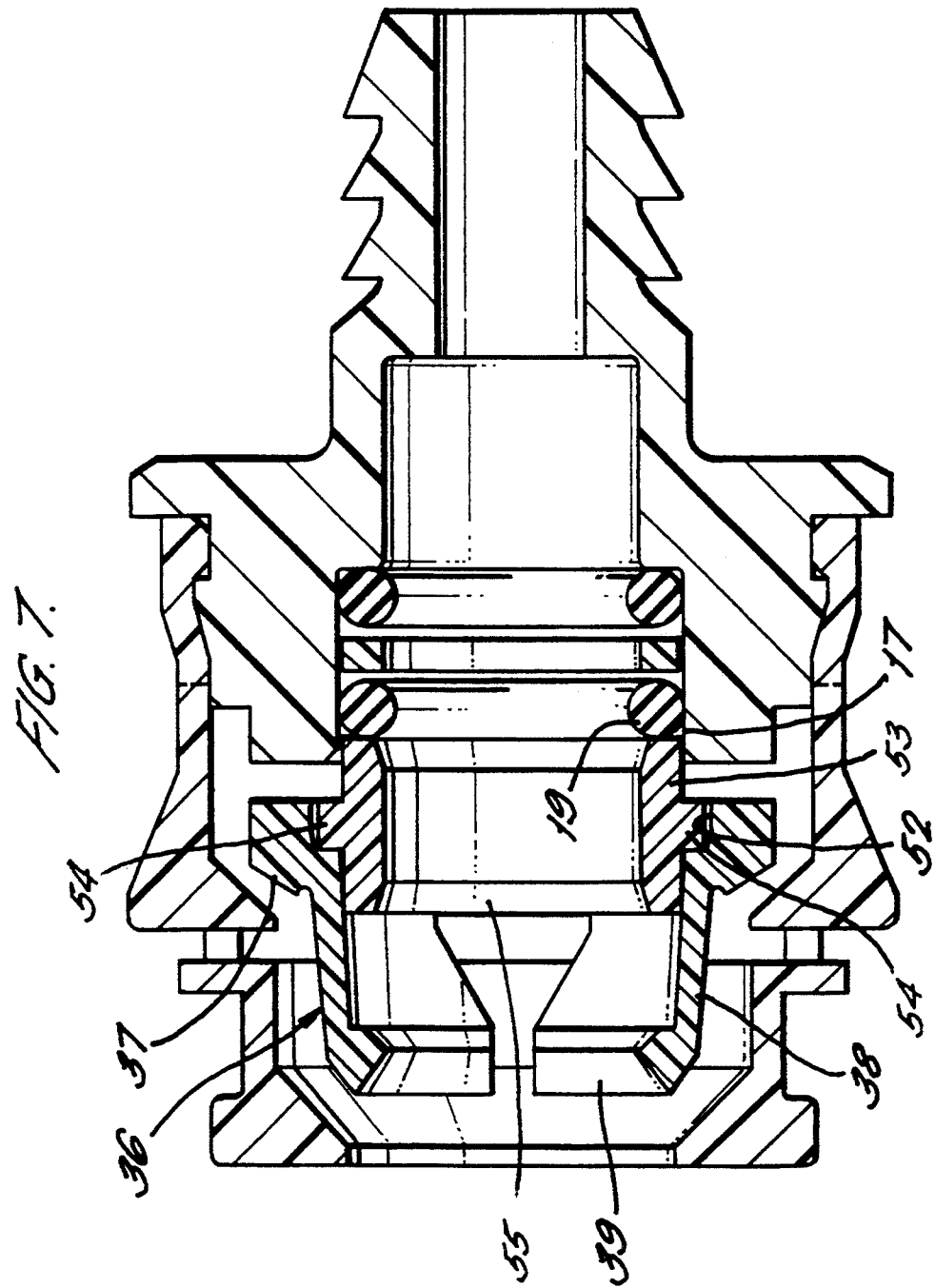
FIG. 7 is a cross sectional view through a tube coupling embodying the further features of the invention.
Figure 8:
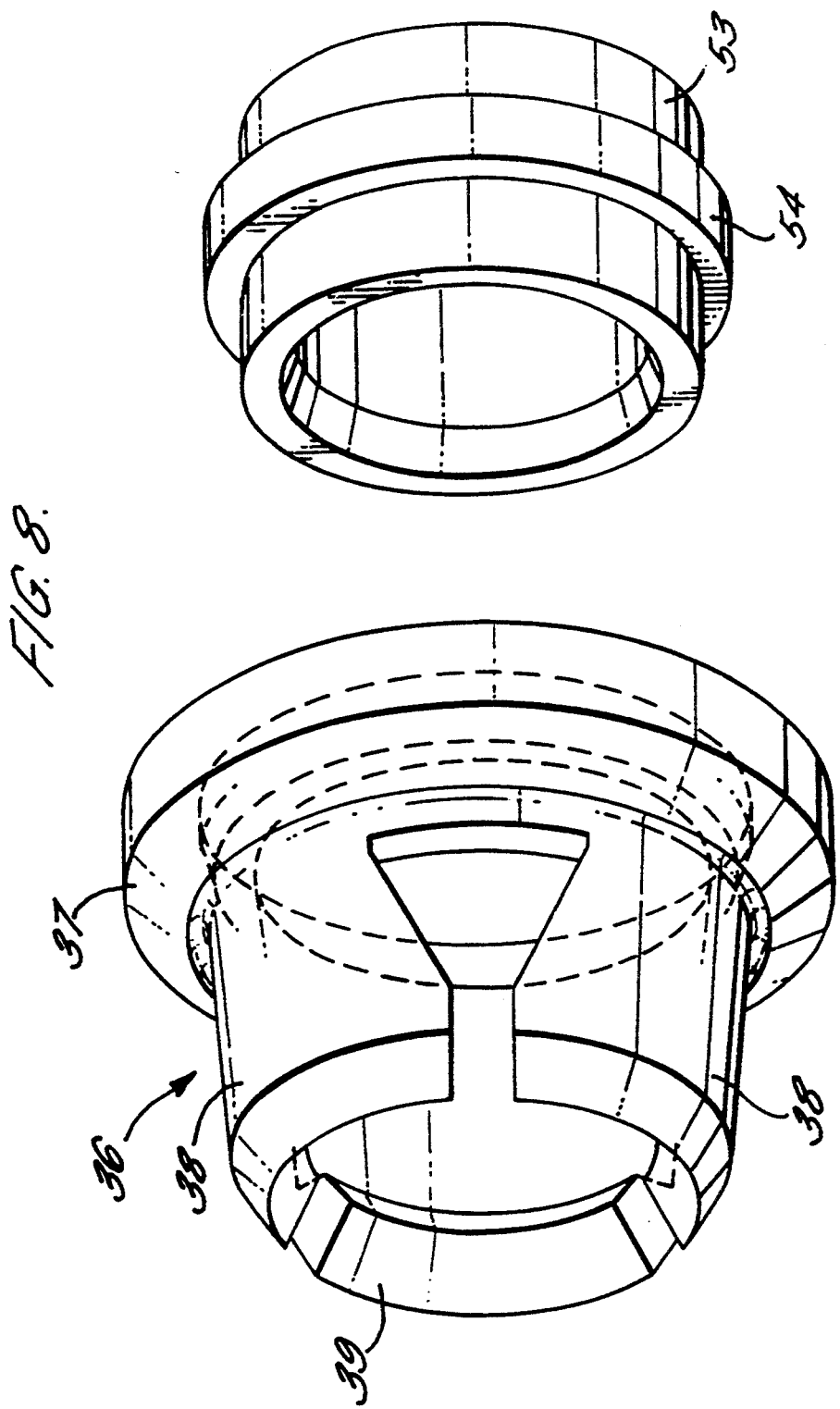
FIG. 8 is an exploded view of the collet and intermediate sleeve of the coupling shown in FIG. 7.

The tube coupling shown in FIGS. 7 and 8 is a modification of the arrangement shown in FIG. 6 and like parts have been alloted the same reference numerals. The principal differences in the further arrangement relate to the collet 36. The collet is formed with three resilient fingers 38 only of arcuate cross sectional form. At their free ends, the resilient fingers 38 are closely spaced from one another but they are heavily tapered towards the annular head 37 of the collet to increase the resilience of the fingers in the radial direction.

An intermediate alignment sleeve 53 has one end engaging in the open end 17 of the throughway and abutting the outermost of the O-ring seals 19 and the other end engaging in the opening in the head of the collet. The sleeve has an encircling shoulder 54 which engages in a counter bore 52 around the opening into the collet. The sleeve 50 aligns the collet 36 with the throughway in the coupling body to facilitate insertion of the tube through the collet into the coupling body. To that end, the ends of the bore through the sleeve are chamferred as indicated at 55 to facilitate entry of a tube end into the sleeve.

What is claimed is:

1. A tube coupling for releasably gripping a tube comprising a coupling body having a throughway open at one end to receive a tube, tube gripping means disposed in the throughway to grip and hold the tube and to resist extraction of the tube from the throughway, detent means mounted in the coupling body adjacent to the tube gripping means for engaging an annular abutment on the tube to retain the tube in the coupling body, and a single only release means disposed on the coupling body for releasing both the detent means and the tube gripping means to enable the tube to be extracted from the tube coupling.

2. A tube coupling as claimed in claim 1, wherein the tube gripping means includes a grip relieving means for causing the tube gripping means to cease gripping and holding the tube, said grip relieving means projecting from the open end of the throughway and operable by being depressed into the throughway.

3. A tube coupling as claimed in claim 1, wherein the coupling body has an enclosure for closing the open end of the coupling body, said enclosure having an aperture through which a tube extends when it is inserted into the throughway, the detent means located in the enclosure, said single only release means disposed on the enclosure.

4. A tube coupling as claimed in claim 3, wherein the detent means comprises a collet which is axially moveably disposed between an end wall of the enclosure and an end of the coupling body, the collet having an annular head engageable with said grip relieving means and projecting from the coupling body, said collet including radially resilient fingers which project towards the end wall of the enclosure and which snap over the annular abutment on a tube when the tube is inserted into the coupling body.

5. A tube coupling as claimed in claim 4, wherein the end wall of the enclosure has an inwardly facing abutment surface with which the ends of the fingers are engageable to hold the fingers against radial outward movement and thereby locking the tube in the coupling body, whereby the action of pulling the tube in a direction outwardly of the coupling body draws the grip relieving means outwardly of the coupling body until the tube gripping means grips and holds the tube and the resulting movement of the collet with the grip relieving means causes the radially resilient fingers to engage with the abutment surface.

6. A tube coupling as claimed in claim 5, wherein the single only release means comprises means to move the collet into engagement with the grip relieving means to disengage the ends of the radially resilient fingers from the inwardly facing abutment surface and to move the grip relieving means inwardly into the tube coupling body to enable a tube to be extracted from the coupling body.

7. A tube coupling as claimed in claim 6, wherein the inwardly facing abutment surface extends around the enclosure aperture.

8. A tube coupling as claimed in claim 6 wherein the annular head has an encircling angled ramp face on the side of the collet which is disposed away from the coupling body, a plurality of depressible plunger elements disposed on the enclosure, said plunger elements having angled cam faces engageable with the angled ramp face to move the collet towards the coupling body upon depression of the plunger elements.

9. A tube coupling as claimed in claim 8, wherein the plunger elements are formed integrally with flexible webs which are disposed on a wall of the enclosure.

10. A tube coupling as claimed in claim 1, wherein said tube gripping means and said grip relieving means comprise a second collet having a head disposed outside the coupling body and a plurality of resilient fingers projecting into the coupling body and the throughway has an internal cam surface which tapers towards the open end of the throughway, the resilient fingers engageable with the internal cam surface whereby the resilient fingers are depressed radially inwardly to engage and grip a tube upon movement of the second collet outwardly of the throughway and to release the tube upon movement of the second collet inwardly of the throughway.

11. A tube coupling body as claimed in claim 10, wherein an annular cam element is disposed in the throughway of the coupling body, the ends of the resilient fingers of the second collet engaging the annular cam element when the second collet is depressed into the throughway to thereby expand the resilient fingers and release the tube.

12. A tube coupling as claimed in claim 1, wherein the tube gripping means comprises a grab ring mounted in the throughway and a sleeve extending from the grab ring through the open end of the throughway whereby depression of the sleeve causes the grab ring to cease gripping and holding the tube.

13. A tube coupling comprising a coupling body having a throughway open at one end to receive a tube, an enclosure disposed on the body and extending over said one end, an end wall of the enclosure spaced from said one end, said enclosure having an aperture to receive a tube, a collet mounted in the enclosure for limited axial movement between the end wall and the coupling body, the collet having a head adjacent the coupling body and resilient fingers projecting towards the end wall to snap over an annular abutment on a tube when a tube is inserted through the enclosure into the coupling body and release means disposed on the enclosure for releasing the fingers from the annular abutment to allow extraction of the tube from the tube coupling.

14. A tube coupling as claimed in claim 13, wherein the end wall has an annular inwardly facing abutment encircling the aperture with which the ends of the resilient fingers are engageable to restrain the fingers against outward movement, said release means operable to displace the collet towards the coupling body to disengage the resilient fingers from engagement with said annular inwardly facing abutment and thereby allow outward movement of the fingers to release the tube.

15. A tube coupling as claimed in claim 14, wherein the annular inwardly facing abutment comprises a bevelled face around the inside of the aperture in the end wall and outer sides of ends of the finger are chamfered to engage the bevelled face.

16. A tube coupling as claimed in claim 14, wherein the head of the collet has an angled annular cam surface on the side of the head adjacent said end wall and wherein a wall of said enclosure has resiliently mounted presser members at diametrically disposed at opposed locations around said enclosure wall and extending radially into the enclosure and, said presser members having inclined faces which engage the collet to displace the collet towards the coupling body upon depression of the presser members to release the tube from the collet.

17. A tube coupling as claimed in claim 1, wherein one or more O-ring seals are mounted in the throughway to seal the external surface of the tube.

18. A tube coupling as claimed in claim 13, wherein the resilient fingers taper towards the head of the collet to increase the radial flexibility of the fingers adjacent the collet head.

19. A tube coupling as claimed in claim 18, wherein the collet has three resilient fingers, said resilient fingers having free ends which are closely spaced and which taper in width towards the head of the collet.

20. A tube coupling as claimed claim 13, wherein the collet is aligned with the throughway by means of an intermediate sleeve which extends between the throughway and collet.

21. A tube coupling as claimed in claim 20, wherein the sleeve extends to the head end of the collet and is provided with an encircling shoulder, said collet having a counterbore in which said encircling shoulder is seated.

* * * * *